United States Patent
Hsieh

(10) Patent No.: US 10,352,086 B2
(45) Date of Patent: *Jul. 16, 2019

(54) ESCAPE SYSTEM FOR A SINKING CAR AND AN OPTOELECTRONIC COMPONENT THEREOF

(71) Applicant: Jr-Hui Hsieh, Taoyuan (TW)

(72) Inventor: Jr-Hui Hsieh, Taoyuan (TW)

( * ) Notice: Subject to any disclaimer, the term of this patent is extended or adjusted under 35 U.S.C. 154(b) by 69 days.

This patent is subject to a terminal disclaimer.

(21) Appl. No.: 15/697,552

(22) Filed: Sep. 7, 2017

(65) Prior Publication Data
US 2019/0004264 A1 Jan. 3, 2019

(30) Foreign Application Priority Data

Jul. 3, 2017 (TW) .............................. 106122281 A

(51) Int. Cl.
*E05F 15/72* (2015.01)
*B60R 21/00* (2006.01)
(Continued)

(52) U.S. Cl.
CPC ............. *E05F 15/72* (2015.01); *B60J 7/0573* (2013.01); *B60R 21/00* (2013.01); *B60R 22/322* (2013.01);
(Continued)

(58) Field of Classification Search
CPC ............ B60R 21/00; B60R 2021/0016; B60R 22/321; B60R 22/322; G01V 8/10;
(Continued)

(56) References Cited

U.S. PATENT DOCUMENTS 3,557,619 A * 1/1971 Hershler .............. G01N 21/431
73/335.01
4,144,752 A * 3/1979 Lolk ...................... G01F 1/662
73/861.28
(Continued)

FOREIGN PATENT DOCUMENTS

CN 203705335 U * 7/2014
DE 102005031177 A1 * 1/2007 ......... G01N 21/3504
(Continued)

OTHER PUBLICATIONS

JPO machine translation of JP 11-206900 (original JP document published Aug. 3, 1999) (Year: 1999).*

*Primary Examiner* — Behrang Badii
*Assistant Examiner* — David A Testardi
(74) *Attorney, Agent, or Firm* — Jackson IPG PLLC; Demain K. Jackson

(57) ABSTRACT

An escape system for a sinking car and an optoelectronic component thereof are disclosed. The optoelectronic component includes a housing and an optoelectronic module. The escape system for a sinking car includes an optoelectronic component and a motherboard. A lighting unit of the escape system for a sinking car and an optoelectronic component thereof is installed on a car to emit light. After the car fell into water, by the characteristic that when light passes through a medium, the attenuation in light energy can be detected effectively because light is absorbed by that medium (such as liquid), the car sinking signal can be received and transmitted quickly, thereby actually taking the opportunities of rescue to reduce casualties.

11 Claims, 6 Drawing Sheets

(51) Int. Cl.
  *G02B 6/42* (2006.01)
  *B60R 22/32* (2006.01)
  *G01S 19/17* (2010.01)
  *E05F 15/695* (2015.01)
  *B60J 7/057* (2006.01)
  *E05F 15/74* (2015.01)
  *E05F 15/73* (2015.01)

(52) U.S. Cl.
  CPC ............ *E05F 15/695* (2015.01); *E05F 15/74* (2015.01); *G01S 19/17* (2013.01); *G02B 6/4248* (2013.01); *G02B 6/4256* (2013.01); *B60R 2021/0016* (2013.01); *E05F 2015/765* (2015.01); *E05Y 2400/445* (2013.01); *E05Y 2800/252* (2013.01); *E05Y 2800/428* (2013.01)

(58) Field of Classification Search
  CPC .. G01V 8/12; E05F 15/72; E05F 15/74; E05F 2015/765; G08B 21/08; G08B 21/20; G01N 21/3554; E05Y 2800/252; E05Y 2800/428
  See application file for complete search history.

(56) References Cited

U.S. PATENT DOCUMENTS

| | | | | |
|---|---|---|---|---|
| 4,197,458 A | * | 4/1980 | Perren | G01F 23/2925 |
| | | | | 250/341.2 |
| 4,333,016 A | * | 6/1982 | Bilstad | A61M 1/3624 |
| | | | | 250/214 R |
| 4,876,889 A | * | 10/1989 | Shakkottai | G01N 29/024 |
| | | | | 374/142 |
| 6,123,166 A | * | 9/2000 | Verellen | B60R 22/321 |
| | | | | 180/268 |
| 6,288,506 B1 | * | 9/2001 | Hiwatari | G05B 9/02 |
| | | | | 180/281 |
| 6,333,685 B1 | * | 12/2001 | Miyake | B60J 7/0573 |
| | | | | 340/425.5 |
| 6,459,168 B1 | * | 10/2002 | Miyake | G05B 9/02 |
| | | | | 307/10.1 |
| 8,248,256 B1 | * | 8/2012 | Gerardi | G08B 21/20 |
| | | | | 340/604 |
| 9,290,144 B1 | * | 3/2016 | Cox | B60R 21/01 |
| 10,150,439 B1 | * | 12/2018 | Hsieh | B60R 21/0136 |
| 2006/0015232 A1 | * | 1/2006 | Cantu | B60J 5/042 |
| | | | | 701/49 |
| 2011/0054794 A1 | * | 3/2011 | Teder | G01N 21/552 |
| | | | | 702/3 |
| 2013/0340158 A1 | * | 12/2013 | Stauber | A61H 33/005 |
| | | | | 4/541.2 |
| 2016/0202108 A1 | * | 7/2016 | Kopansky | G01F 23/292 |
| | | | | 250/576 |

FOREIGN PATENT DOCUMENTS

| | | | | |
|---|---|---|---|---|
| FR | 2672390 A1 | * | 8/1992 | ......... G01F 23/2925 |
| JP | 56157819 A | * | 12/1981 | ........... G01F 23/292 |
| JP | 59204742 A | * | 11/1984 | ............. G01N 21/81 |
| JP | 61264239 A | * | 11/1986 | ......... G01N 21/3554 |
| JP | 09096581 A | * | 4/1997 | |
| JP | 11071961 A | * | 3/1999 | ......... G01N 21/3554 |
| JP | 11206900 A | * | 8/1999 | |
| JP | 2000085346 A | * | 3/2000 | ........... G01F 23/292 |
| JP | 2000318445 A | * | 11/2000 | |
| JP | 2001228084 A | * | 8/2001 | ......... G01F 23/2925 |
| JP | 2008096378 A | * | 4/2008 | |

\* cited by examiner

ESCAPE SYSTEM FOR A SINKING CAR AND AN OPTOELECTRONIC COMPONENT THEREOF

BACKGROUND OF THE INVENTION a) Field of the Invention

The present invention relates to an escape system for a sinking car and an optoelectronic component thereof; and more particularly to an escape system for a sinking car and an optoelectronic component thereof that can facilitate receiving and transmitting the car sinking signal quickly, so as to take opportunities of rescue.

b) Description of the Prior Art

In the government promotion information, people are often educated that when their cars fall into water accidentally, the cars may sink easily due to the weight of the engines at the car heads. When this thing happens, people in the car should keep calm, unlock the seat belt in the very first moment and open a car window as soon as possible, so that they can climb out of the car from the window before the car sinks. However, if the car has already sunk in the water completely, the car doors will not be opened easily due to the hydraulic pressure difference between the inner part and the outer part of the car, and the automatic windows will not be activated as water has entered into the car. At this moment, the car will sink completely in about 90 seconds, and the trapped persons should find a sharp object in the car in time to strike the windshields that they may have a chance of survival. On the contrary, if not being able to take the chance of escape in 90 seconds, the trapped persons will have a very little chance of survival.

A Taiwanese New Utility Patent No. M416576, "SINKING-PROOF AIRBAG SYSTEM FOR A CAR," is used to solve the abovementioned issue. This patent includes a body, an inflating device, a water gauge and a control unit. The body is provided with sides, the inflating device is mounted securely on one side of the body and includes a pressurized gas cylinder, an airbag and an airbag control module. The pressurized gas cylinder is mounted inside the body, the airbag is mounted outside the body, and the airbag control module is connected electrically to the pressurized gas cylinder and the airbag. The airbag control module includes a hoop, a pressurized gas cylinder switch and a drive. The water gauge is mounted outside the body, and the control unit is connected electrically to the water gauge and the airbag control module. Accordingly, when the water gauge has detected that the water level is too high, the inflating device can be activated to inflate the airbag quickly, thereby preventing the body from sinking, which in turn can save the life of the driver. Furthermore, a warning lamp is mounted securely on a top of the body to flash for rescue. However, when the car falls into water, the water gauge and the airbag will move upward due to the buoyancy effect of water, and the operation time of the airbag is affected by the tension of the spring, which acts as a resistant force. Therefore, the signal transmission time of the sensor is delayed, which in turn postpones the timing in inflating the airbag. Eventually, the timing in rescuing the trapped person is missed. Therefore, how to effectively facilitate transmitting the distress signal quickly when the car falls into water to take the opportunities of rescue by an innovative design is the issue to be overcome and solved for the escape system for a sinking car.

SUMMARY OF THE INVENTION

The primary object of the present invention is to provide an escape system for a sinking car and an optoelectronic component thereof, so that the car sinking signal can be received and transmitted quickly to take the opportunities of rescue. The present invention comprises primarily a lighting unit that is mounted on a car to emit light. When a car falls into water, by the characteristic that when light penetrates a medium, the light will be absorbed by that medium (such as liquid), the attenuation in light energy can be detected effectively, which facilitates receiving and transmitting the car sinking signal quickly, thereby actually achieving the benefit in taking the chances of rescue to reduce casualties.

According to the abovementioned object, the present invention provides an optoelectronic component, which includes at least a housing and an optoelectronic module. An interior of the housing is provided with a holding space, at least a side of the housing is opened with a through-hole, and at least two shield plates are disposed correspondingly on two sides of the through-hole, wherein an angle is provided between the shield plate and the side of the housing. The optoelectronic module is disposed in the holding space and includes a lighting unit, a receiving unit, a computation unit that is connected electrically to the receiving unit, and a signal transmission unit that is connected electrically to the computation unit. The lighting unit projects a light beam, whereas the receiving unit receives the light beam projected by the lighting unit and analyzes the luminous intensity of the light beam. The computation unit compares the luminous intensity transmitted by the receiving unit with a built-in luminous intensity. When the luminous intensity is smaller than the setting of the luminous intensity, the computation unit will generate a car sinking signal and the signal transmission unit will send out that car sinking signal through a wire communication or wirelessly.

According to the abovementioned optoelectronic component, the angle is between 5° and 65°.

According to the abovementioned optoelectronic component, the lighting unit is a monochrome lighting element, a monochrome lighting device, an LED (Light Emitting Diode) or an optical fiber.

According to the abovementioned optoelectronic component, the equation used by the receiving unit to analyze the luminous intensity of the light beam is $$A = -\log_{10}\left(\frac{I}{I_0}\right) = -\log_{10}(T),$$

where A is the absorbance, I is the luminous intensity after light passes through a medium, $I_0$ is the luminous intensity before light passes through that medium, and T is the transmittance or the percentage of light transmission.

According to the abovementioned optoelectronic component, an inner side of the through-hole can be further provided with a water permeable layer.

According to the abovementioned optoelectronic component, the water permeable layer is a layer of material containing fiber or a layer of cloth.

In addition, according to the object of the present invention, the present invention also discloses another kind of escape system for a sinking car, including at least an abovementioned optoelectronic component and a motherboard. The motherboard is connected electrically to the optoelectronic component. Upon receiving the car sinking signal transmitted by the signal transmission unit, the motherboard connects electrically a motor of the car to open at least a car window or a sunroof, as well as connects electrically an electromagnetic switch of the car to unlock at least a seat belt.

In accordance with the abovementioned escape system for a sinking car, the escape system for a sinking car can be further provided with an UPS (Uninterruptible Power Supply) which supplies electricity required by the escape system for a sinking car uninterruptedly.

In accordance with the abovementioned escape system for a sinking car, the escape system for a sinking car can be further connected electrically to an APP (application) inside a mobile device installed in the car or held by the driver. Upon receiving the car sinking signal, the escape system for a sinking car will activate an automatic positioning function in the APP.

In accordance with the abovementioned escape system for a sinking car, the APP can further send out a distress text or dial a distress call through a voice assistance or an automatic dialing mechanism.

In accordance with the abovementioned escape system for a sinking car, the motherboard is provided with a control unit.

In accordance with the abovementioned escape system for a sinking car, the control unit can be further connected electrically to a car horn and plural car lamps, so that when the motherboard receives the car sinking signal, the horn will be activated to sound and the car lamps will be activated to flash.

Accordingly, in the escape system for a sinking car and an optoelectronic component thereof, by the characteristic that when light penetrates a medium, the light will be absorbed by that medium (such as liquid), the attenuation in light energy can be detected effectively. This will facilitate receiving and transmitting the message of car sinking, thereby actually achieving the benefit in taking the opportunities of rescue to reduce casualties.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

For the examiners to understand the technical features, the content, and the advantages of the present invention, as well as the benefits that the present invention can achieve, the present invention is hereinafter described in details with the accompanying drawings and the expression in the form of an embodiment. The drawings used in the description are only for illustration and as assistance to the specification, which may not be necessarily true in scale and precise configuration after the implementation of the present invention. Therefore, one should not interpret according to the scale and configuration in the accompanying drawings to limit the claims of the present invention on practical implementation.

Figure 1:
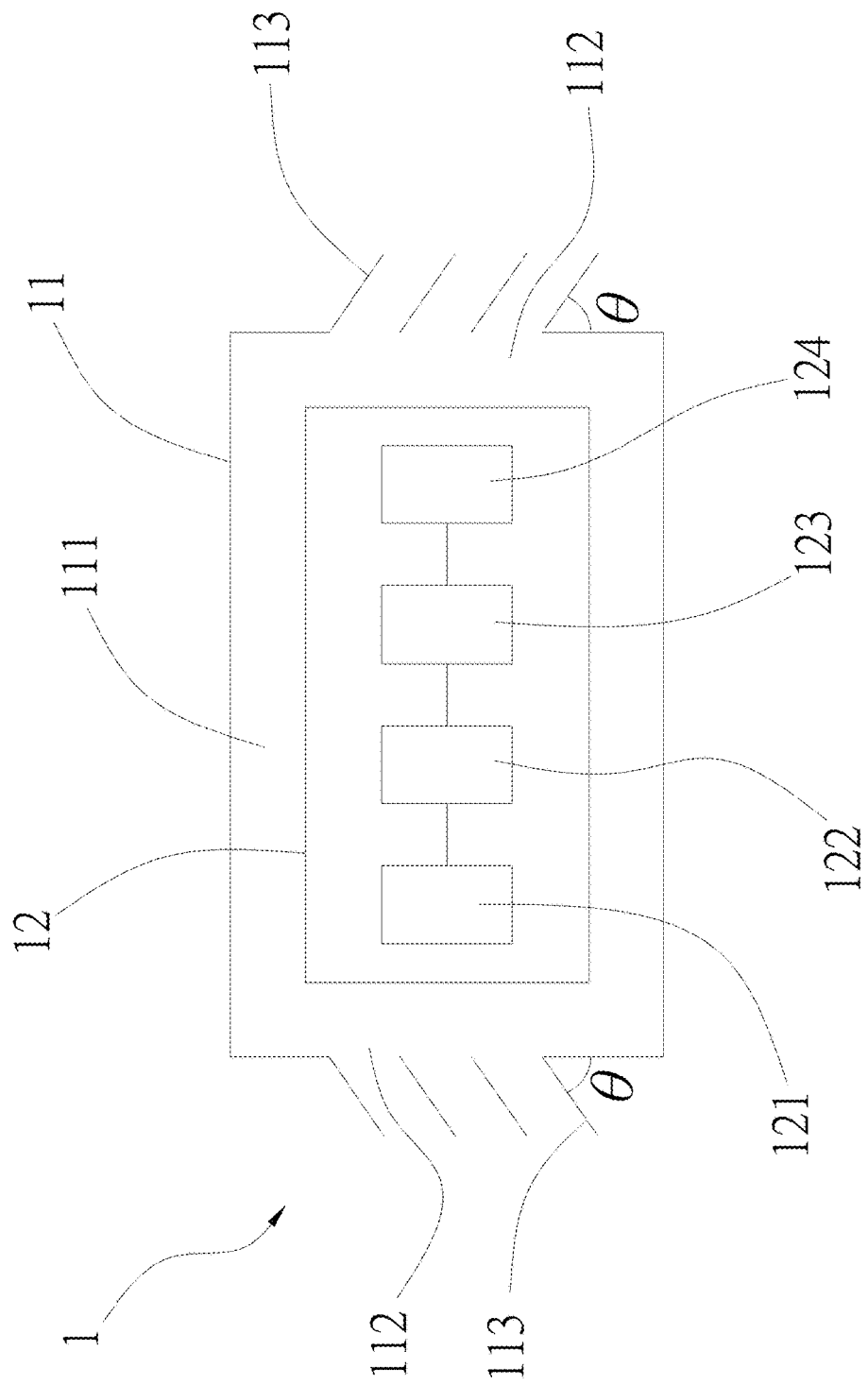
FIG. 1 shows a block diagram of provision of a first preferred embodiment of an optoelectronic component, according to the present invention.

First, as shown in FIG. 1, it shows a block diagram of provision of a first preferred embodiment of an optoelectronic component according to the present invention. The optoelectronic component 1 comprises at least a housing 11 and an optoelectronic module 12. An interior of the housing 11 is provided with a holding space 111. Each of the two opposite sides of the housing 11 is opened at least with a through-hole 112, and at least two shield plates 113 are provided correspondingly on two sides of the through-hole 112, wherein an angle θ is provided between the shield plate 113 and the side of the housing 11. In addition, the angle θ is between 5° and 65°. In the first preferred embodiment of the present invention, the housing 11 is in a rectangular shape, and an interior thereof is formed with a holding space 111. Each of the two sides of the housing 11 is opened with at least a through-hole 112, and four shield plates 113 are provided correspondingly on two sides of the through-hole 112. An angle θ in 5° to 65° between the shield plate 113 and the side of the housing 11 prevents water from splashing into the housing 11 directly by a user washing the car, raining or other non-sinking factor, thereby resulting in misjudgment.

The optoelectronic module 12 is disposed in the holding space 111 and includes a lighting unit 121, a receiving unit 122, a computation unit 123 that is connected electrically to the receiving unit 122, and a signal transmission unit 124 that is connected electrically to the computation unit 123. The lighting unit 121 projects a light beam, whereas the receiving unit 122 receives the light beam projected by the lighting unit 121 and analyzes the luminous intensity of the light beam. The computation unit 123 compares the luminous intensity transmitted by the receiving unit 122 with a built-in luminous intensity. When the luminous intensity is smaller than the setting of the luminous intensity, the computation unit 123 will generate a car sinking signal, and the signal transmission unit 124 will send out the car sinking signal through a wire communication or wirelessly. Besides that, the lighting unit 121 is a monochrome lighting element, a monochrome lighting device, an LED or an optical fiber. In the first preferred embodiment of the present invention, the lighting unit 121 that manifests a monochrome lighting element emits a light beam, whereas the receiving unit 122 receives the light beam projected by the lighting unit 121 and analyzes the luminous intensity of the light beam. The equation that the receiving unit 122 uses to analyze the luminous intensity of the light beam is $$A = -\log_{10}\left(\frac{I}{I_0}\right) = -\log_{10}(T),$$

where A is the absorbance, I is the luminous intensity after light passes through a medium, $I_0$ is the luminous intensity before light passes through that medium, and T is the transmittance or the percentage of light transmission. It can be seen from the above equation that the more light is absorbed, the smaller the magnitude of T is, and the larger the magnitude of A is. In addition, the Beer-Lambert law also shows that when a beam of monochrome light irradiates on a surface of absorption medium and passes through a certain thickness, as the medium absorbs part of light energy, the intensity of the transmitted light will be attenuated. Therefore, the larger the concentration of the absorption medium is, the larger the thickness of the medium is, and the weaker the luminous intensity of light is. Next, the computation unit 123 compares the luminous intensity transmitted by the receiving unit 122 with a built-in luminous intensity. If the luminous intensity is smaller than the setting of luminous intensity, the computation unit 123 will generate a car sinking signal, and the signal transmission unit 124 will send out the car sinking signal through a wire communication or wirelessly. It is due to that when the car falls into water and after light penetrates a medium, light energy is attenuated to detect whether the car falls into water, because light is absorbed by the medium (such as liquid). In addition, as light conducts rapidly, it will facilitate sending out the car sinking signal quickly upon receiving that car sinking signal immediately, thereby taking the chances of rescue.

Figure 2:
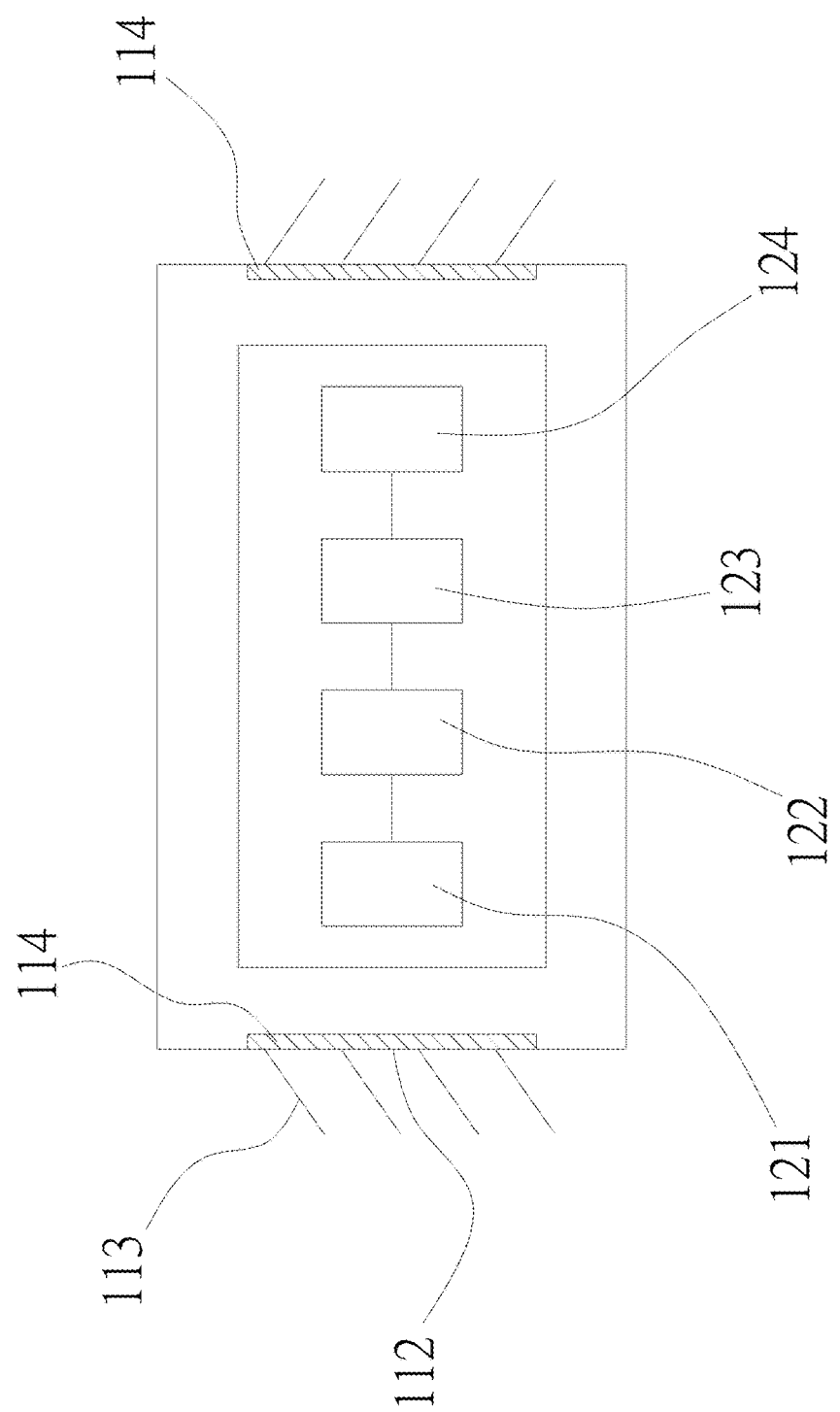
FIG. 2 shows a block diagram of provision of a second preferred embodiment of the optoelectronic component, according to the present invention.

Furthermore, an inner side of the through-hole 112 is further provided with a water permeably layer 114 that is a layer of material containing fiber or a layer of cloth. Referring to FIG. 2 together, it shows a block diagram of provision of a second preferred embodiment of the optoelectronic component, according to the present invention. The water permeable layer 114, which manifests as a layer of material containing fiber or a layer of cloth, is disposed inside the through-hole 112 and can be used to block dusts outside the through-hole 112, which prevents from the misjudgment by the deviation of the luminous intensity to affect the operation of the car sinking signal.

Figure 3:
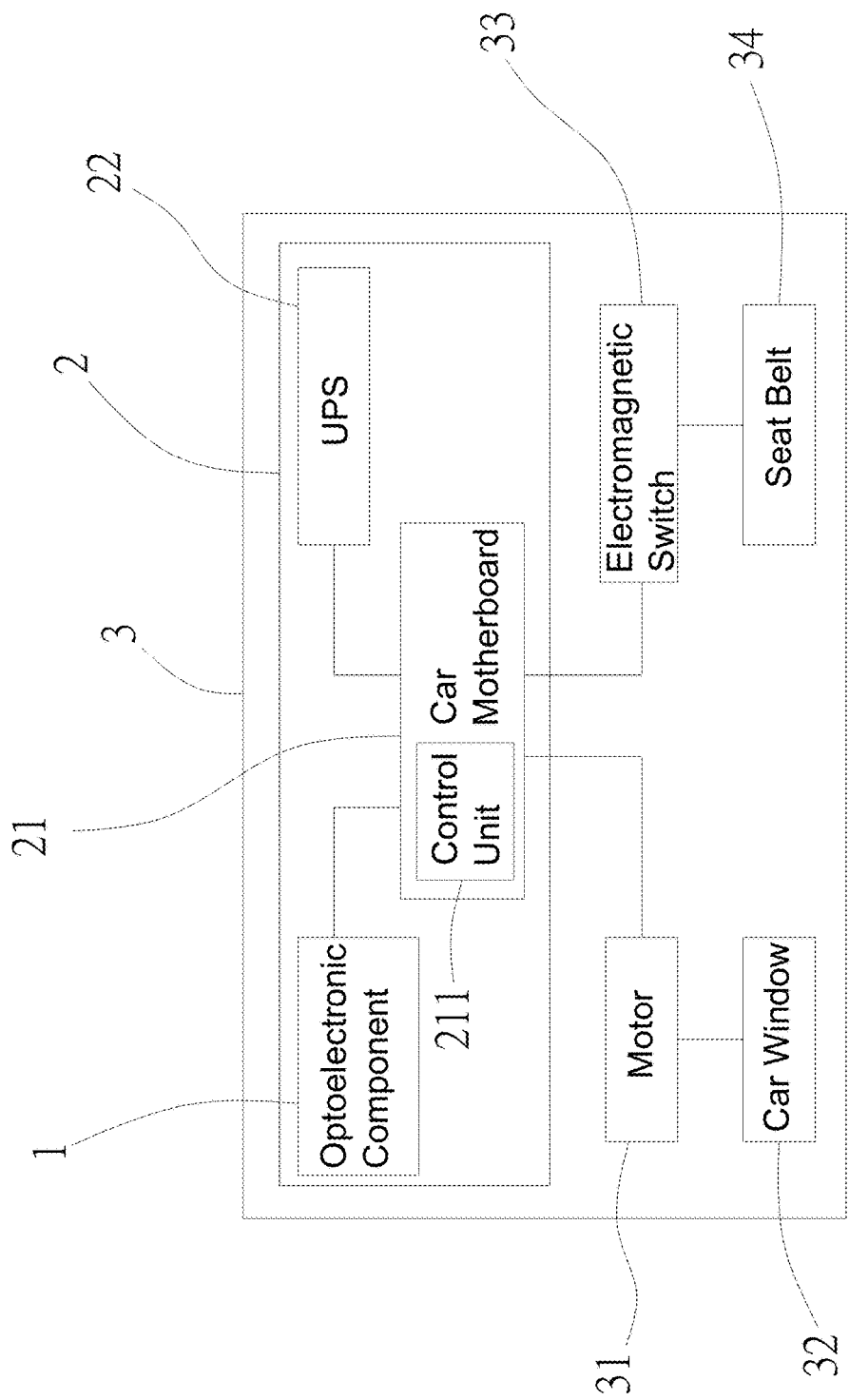
FIG. 3 shows a block diagram of provision of a first preferred embodiment of an escape system for a sinking car, according to the present invention.
Figure 4:
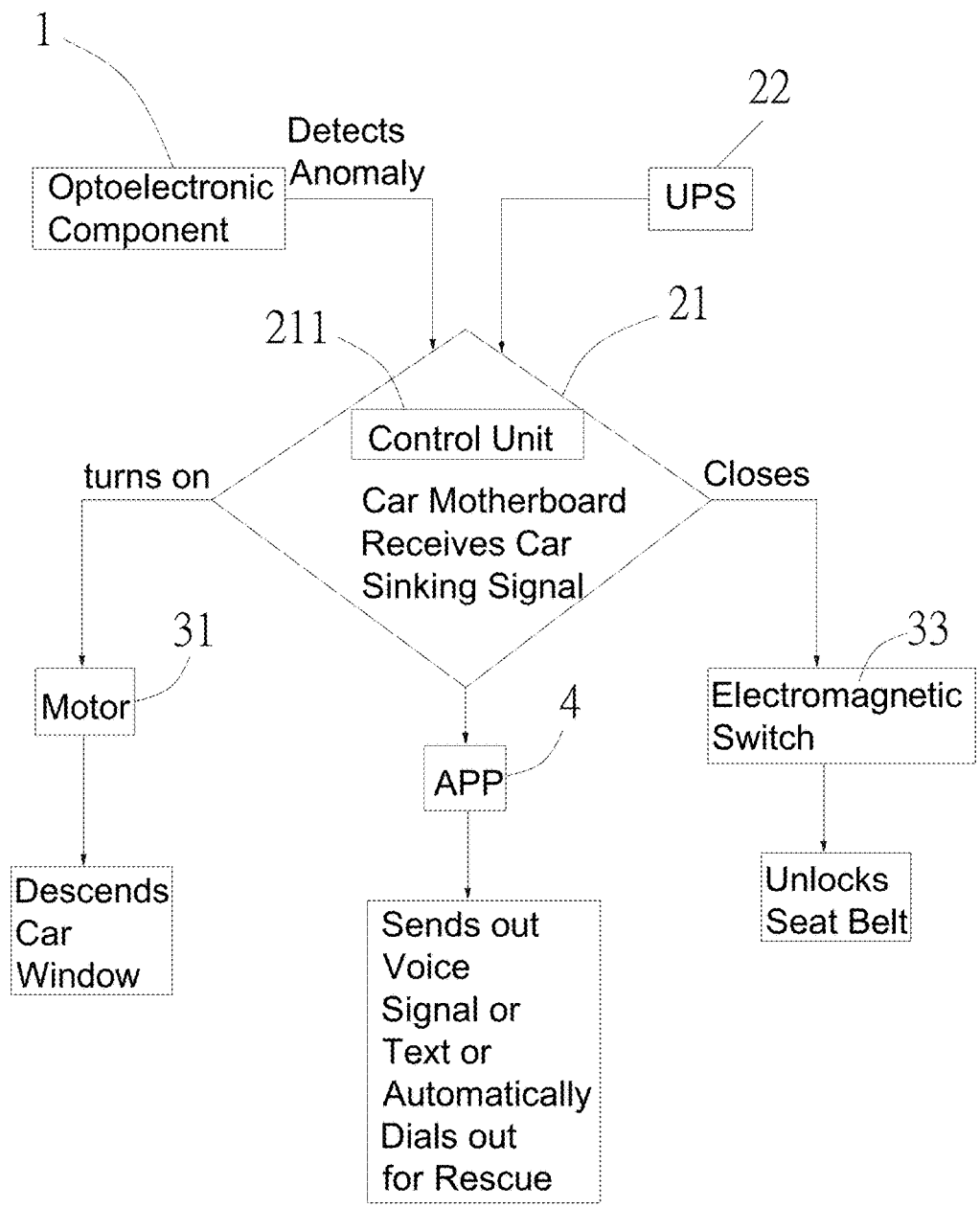
FIG. 4 shows a schematic view of an operation of the first preferred embodiment of the escape system for a sinking car, according to the present invention.

Moreover, to achieve the abovementioned object, the present invention also discloses another kind of escape system for a sinking car 2. Referring to FIG. 3 and FIG. 4, it shows a block diagram of provision and a schematic view of an operation, of a first preferred embodiment of an escape system for a sinking car, according to the present invention. The escape system for a sinking car 2 comprises at least an abovementioned optoelectronic component 1 and a motherboard 21, wherein the motherboard 21 is connected electrically to the optoelectronic component 1. Upon receiving the car sinking signal transmitted by the signal transmission unit 124, the motherboard 21 connects electrically a motor 31 of a car 3 to open at least a car window 32, and connects electrically an electromagnetic switch 33 of the car 3 to unlock at least a seat belt 34. In addition, the escape system for a sinking car 2 is further provided with an UPS 22 which supplies electricity required by the escape system for a sinking car 2 uninterruptedly. In the first preferred embodiment of the present invention, the escape system for a sinking car 2 includes an abovementioned optoelectronic component 1 and a motherboard 21. The motherboard 21 is provided with a control unit 211, and the control unit 211 is connected electrically to the motor 31 and the electromagnetic switch 33 of the car 3, wherein the motor 31 is connected electrically to the car windows 32, and the electromagnetic switch 33 is connected electrically to the seat belts 34 of the car 3. After the car 3 fell into water and the motherboard 21 received a car sinking signal transmitted by the electrically connected lighting unit 124, the motherboard 21 will open at least a car window 32 through the motor 31, and unlock at least a seat belt 34 through the electromagnetic switch 33, which facilitates persons in the car 3 to escape successfully. In addition, after the car 3 fell into water and lost power, the UPS 22 will supply electricity required by the escape system for a sinking car 2.

Furthermore, at least an optoelectronic component 1 can be installed on the front side of a car 3 head, the rear side of a car tail, inside the front left door, inside the front right door, inside the rear left door and inside the rear right door, respectively. When the optoelectronic component 1 on the front side of the car head detects anomaly, the motherboard 21 will notify the motors that activate the car windows on the doors at the front, rear, left and right side, as well as the sunroof, in order to descend the car windows and open the sunroof. When the optoelectronic component 1 on the rear side of the car tail detects anomaly, the motherboard 21 will notify the motors that activate the car windows on the doors at the front, rear, left and right side, as well as the sunroof, in order to descend the car windows and open the sunroof. When the optoelectronic component 1 inside the front left door or the optoelectronic component 1 inside the rear left door detects anomaly, the motherboard 21 will notify the motors that activate the car windows on the front right door and the rear right door, as the direction of escape is opposite to the direction that the car fell into water. When the optoelectronic component 1 inside the front right door or the optoelectronic component 1 inside the rear right door detects anomaly, the motherboard 21 will notify the motors that activate the car windows on the front left door and the rear left door. Moreover, the sunroof on a top of the car 3 can be installed with an optoelectronic component 1. When the optoelectronic component 1 on the top of the car detects anomaly, the motherboard 21 will control to close the sunroof and to activate the motors that operate all the car windows on the doors at the right and left side, in order to descend the car windows.

Figure 5:
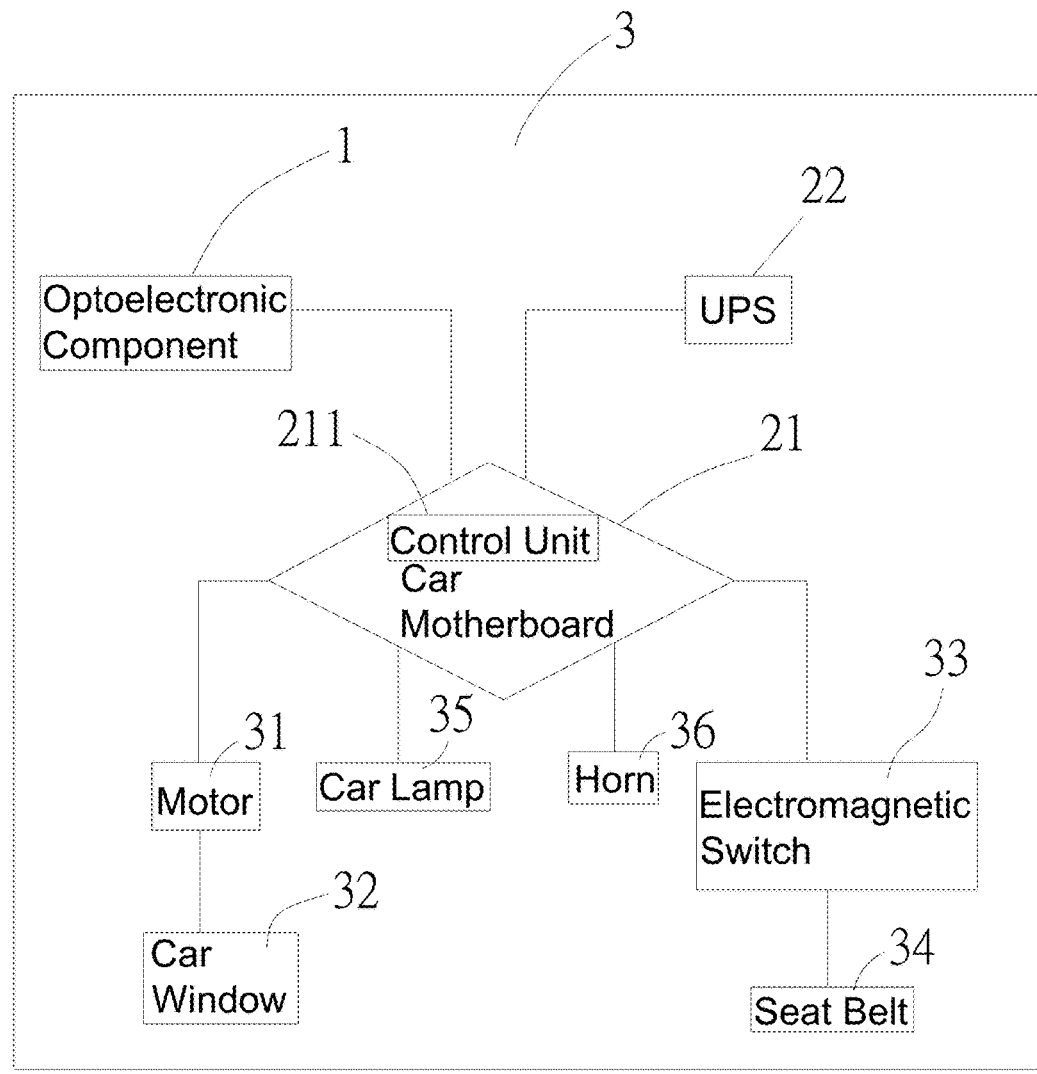
FIG. 5 shows a block diagram of provision of a second preferred embodiment of the escape system for a sinking car, according to the present invention.

On the other hand, referring to FIG. 5 together, it shows a schematic view of an operation of a second preferred embodiment of the escape system for a sinking car, according to the present invention. The escape system for a sinking car 2 can be further connected electrically to an APP 4 inside a mobile device installed in the car 3 or held by the driver. After receiving the car sinking signal, the escape system for a sinking car 2 will activate the automatic positioning function in the APP 4, wherein the APP 4 can further send out a distress text or dial a distress call through a voice assistance or an automatic dialing mechanism. In the first preferred embodiment of the present invention, an interior part of the car 2 is connected to a network and the APP 4 is therefore provided. After receiving the car sinking signal, the escape system for a sinking car 2 connects electrically the APP 4 to activate the automatic positioning function, allowing rescuers to know where the car fell into water. Furthermore, at a same time when the automatic positioning function is activated, the APP 4 can further send out a distress text through a voice assistance, so that the rescuers can be simultaneously aware of where the car fell into water.

Figure 6:
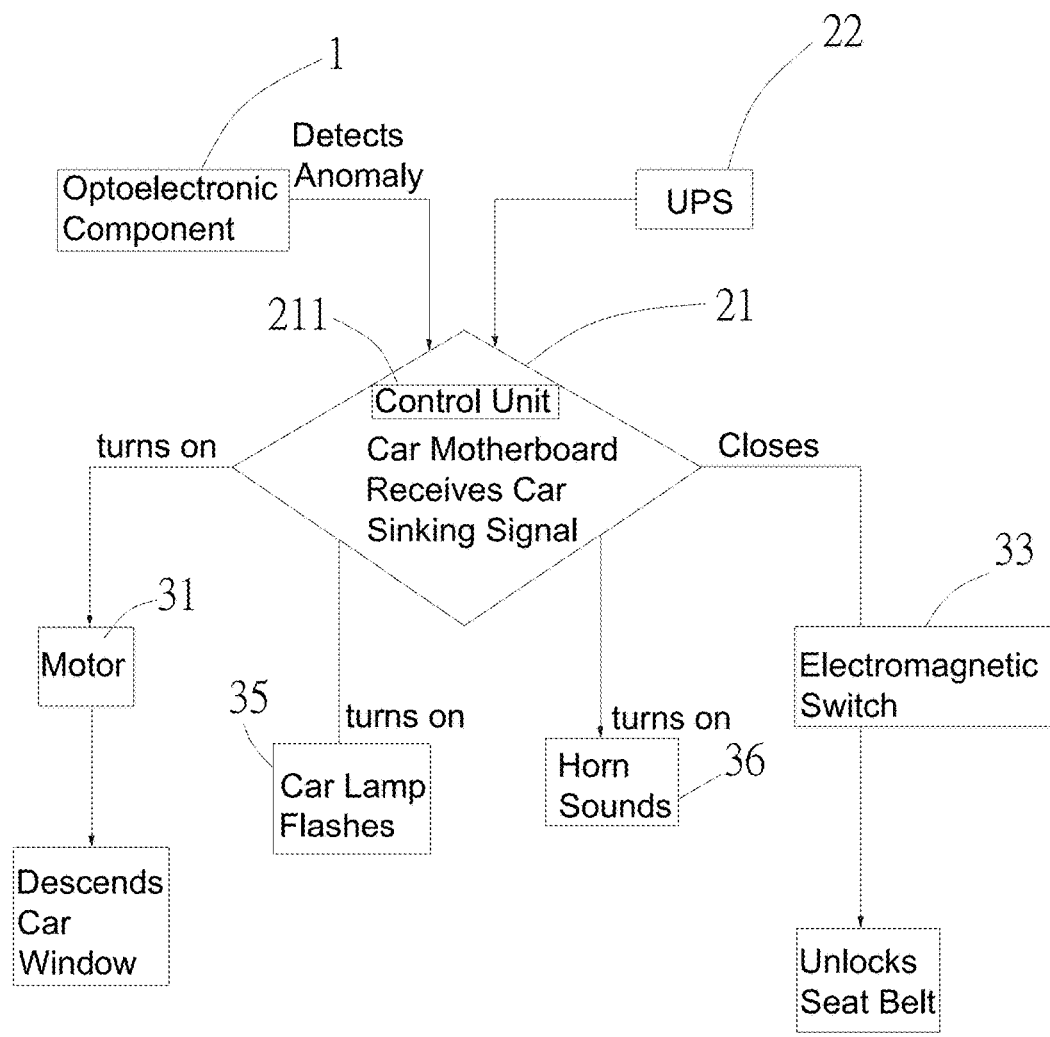
FIG. 6 shows a schematic view of an operation of the second preferred embodiment of the escape system for a sinking car, according to the present invention.

Moreover, as shown in FIG. 5 and FIG. 6, the control unit 211 of the motherboard 21 can be further connected electrically to a horn 36 and plural car lamps 35 of the car 3.

After receiving the car sinking signal, the motherboard 21 will activate the horn 36 to sound, and the car lamps 35 to flash. In the first preferred embodiment of the present invention, the motherboard 21 of the escape system for a sinking car 2 is connected electrically to the horn of the car 3. When receiving the car sinking signal, the escape system for a sinking car 2 will connect electrically the horn of the car 3 and drive the horn to sound, so that the rescuers can find out where the car fell into water through that sound.

Accordingly, in comparison with the existing technology and product, the escape system for a sinking car and an optoelectronic component thereof, in accordance with the present invention, are advantageous in that by the characteristic that when light passes through a medium, the attenuation in light energy can be detected effectively because light is absorbed by the medium (such as liquid), the car sinking message can be received and transmitted quickly, so that the chances of rescue can be taken to reduce casualties.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An optoelectronic component comprising:
a housing, an interior of which is provided with a holding space, and a side of which is opened with a through-hole, with that two shield plates are disposed correspondingly on two sides of the through-hole, and an angle is provided between each of the shield plates and the side of the housing; and
an optoelectronic module, which is disposed inside the holding space and includes a lighting unit, a receiver, a computation unit connected electrically to the receiver, and a signal transmission unit connected electrically to the computation unit, wherein the lighting unit projects a light beam, the receiver receives the light beam projected by the lighting unit and analyzes the luminous intensity of the light beam, and the computation unit compares the luminous intensity transmitted by the receiver with a built-in luminous intensity setting; when the luminous intensity is smaller than the setting of the luminous intensity, the computation unit generating a car sinking signal, and the signal transmission unit sending out that car sinking signal through a wire communication or wirelessly, wherein the angle is between 5° and 65°, the equation that the receiver uses to analyze the luminous intensity of the light beam is $$A = -\log_{10}\left(\frac{I}{I_0}\right) = -\log_{10}(T)$$

where A is the absorbance, I is the luminous intensity after light passes through a medium, $I_0$ is the luminous intensity before light passes through that medium, and T is the transmittance or the percentage of light transmission.

2. The optoelectronic component according to claim 1, wherein the lighting unit is a monochrome lighting element, a monochrome lighting device, an LED or an optical fiber.

3. The optoelectronic component according to claim 1, wherein an inner side of the through-hole is further provided with a water permeable layer.

4. The optoelectronic component according to claim 3, wherein the water permeable layer is a layer of material containing fiber or a layer of cloth.

5. An escape system for a sinking car, being provided on a car and comprising:
the optoelectronic component according to claim 1; and
a motherboard which is connected electrically to the optoelectronic component, wherein after receiving the car sinking signal transmitted by the signal transmission unit, the motherboard connects electrically a motor of the car to activate a car window, and connects electrically an electromagnetic switch of the car to unlock a seat belt.

6. The escape system according to claim 5, wherein the escape system is further provided with an UPS which supplies electricity required by the escape system uninterruptedly.

7. The escape system according to claim 5, wherein the escape system is further connected electrically to an APP inside a mobile device installed in the car or held by the driver, and after receiving the car sinking signal, the escape system turns on an automatic positioning function in the APP.

8. The escape system according to claim 7, wherein the APP further sends out a distress text or dials a distress call through a voice assistance or an automatic dialing mechanism.

9. The escape system according to claim 5, wherein the motherboard is further connected electrically to a horn of the car and turns on the horn to sound after receiving the car sinking signal.

10. The escape system according to claim 5, wherein the motherboard is provided with a control unit.

11. The escape system according to claim 10, wherein the control unit is connected electrically to a motor, plural car lamps and a horn.

* * * * *